US010516665B2

United States Patent
Sonoda et al.

(10) Patent No.: US 10,516,665 B2
(45) Date of Patent: Dec. 24, 2019

(54) NETWORK MANAGEMENT APPARATUS, NETWORK MANAGEMENT METHOD, AND RECORDING MEDIUM

(71) Applicant: NEC Corporation, Tokyo (JP)

(72) Inventors: Kentaro Sonoda, Tokyo (JP); Takayuki Sasaki, Tokyo (JP); Yoichi Hatano, Tokyo (JP); Toshiki Watanabe, Tokyo (JP); Takeo Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 199 days.

(21) Appl. No.: 15/124,787

(22) PCT Filed: Feb. 16, 2015

(86) PCT No.: PCT/JP2015/000696
§ 371 (c)(1),
(2) Date: Sep. 9, 2016

(87) PCT Pub. No.: WO2015/136842
PCT Pub. Date: Sep. 17, 2015

(65) Prior Publication Data
US 2017/0034166 A1   Feb. 2, 2017

(30) Foreign Application Priority Data

Mar. 13, 2014  (JP) .................. 2014-049856

(51) Int. Cl.
*H04L 29/06* (2006.01)
*G06F 21/56* (2013.01)
(Continued)

(52) U.S. Cl.
CPC .......... *H04L 63/0876* (2013.01); *G06F 21/44* (2013.01); *G06F 21/56* (2013.01);
(Continued)

(58) Field of Classification Search
CPC . H04L 63/08; H04L 63/1441; H04L 63/0876; G06F 21/44; G06F 21/56; H04W 12/12
See application file for complete search history.

(56) References Cited

U.S. PATENT DOCUMENTS 5,500,852 A * 3/1996 Riley .................... H04L 29/06
340/9.1
5,852,724 A * 12/1998 Glenn, II ............... H04L 29/06
709/239
(Continued)

FOREIGN PATENT DOCUMENTS

JP  2004-200822 A  7/2004
JP  2010-097343 A  4/2010
(Continued)

OTHER PUBLICATIONS

H. Esquivel, A. Akella and T. Mori, "On the effectiveness of IP reputation for spam filtering," 2010 Second International Conference on COMmunication Systems and NETworks (COMSNETS 2010), Bangalore, 2010, pp. 1-10. (Year: 2010).*
(Continued)

*Primary Examiner* — Kari L Schmidt
(74) *Attorney, Agent, or Firm* — Wilmer Cutler Pickering Hale and Dorr LLP

(57) ABSTRACT

A network management apparatus that connects to a terminal by way of a communication apparatus, includes: a legitimate information generation unit configured to generate legitimate identification information that is identification information to identify the terminal on a network that the network management apparatus manages, the legitimate identification information being managed as legitimate information by the network management apparatus; a fake information generation unit configured to generate fake identification information that is different from the legitimate identification information and that cannot be used as it
(Continued)

is for communication with another terminal; a management unit configured to manage the legitimate identification information and the fake identification information in association with each other; and a registration unit configured to register the fake identification information to the terminal.

12 Claims, 10 Drawing Sheets

(51) Int. Cl.
    *G06F 21/44*     (2013.01)
    *H04L 12/64*     (2006.01)

(52) U.S. Cl.
    CPC .......... *H04L 12/6418* (2013.01); *H04L 63/08* (2013.01); *H04L 63/1441* (2013.01)

(56) References Cited

U.S. PATENT DOCUMENTS

| | | | |
|---|---|---|---|
| 6,601,093 B1* | 7/2003 | Peters ............... | H04L 29/12113 709/220 |
| 8,800,025 B2* | 8/2014 | Fung ................... | H04L 63/102 709/203 |
| 2002/0029345 A1* | 3/2002 | Kawasaki ........... | G06F 12/1408 713/190 |
| 2003/0206536 A1* | 11/2003 | Maggenti ............ | H04L 12/66 370/328 |
| 2004/0117506 A1* | 6/2004 | Ito ...................... | H04L 29/06 709/245 |
| 2007/0115935 A1* | 5/2007 | Qiu .................... | H04L 29/06027 370/352 |
| 2007/0201490 A1* | 8/2007 | Mahamuni .......... | H04L 12/4625 370/395.54 |
| 2007/0288994 A1* | 12/2007 | Tang .................. | H04L 29/12254 726/2 |
| 2009/0059936 A1* | 3/2009 | Van De Poel ...... | H04L 29/12066 370/401 |
| 2010/0110975 A1* | 5/2010 | Cagenius ............ | H04L 29/12584 370/328 |
| 2013/0097046 A1* | 4/2013 | Krishnamurthy .... | G06Q 30/08 705/26.3 |
| 2013/0111596 A1* | 5/2013 | Rayes ................. | H04L 41/28 726/26 |
| 2013/0212644 A1* | 8/2013 | Hughes ............... | H04L 63/00 726/3 |
| 2013/0298181 A1* | 11/2013 | Smith ................. | H04L 61/2539 726/1 |
| 2014/0189160 A1* | 7/2014 | Haddad ............... | H04L 61/251 709/245 |
| 2014/0344917 A1* | 11/2014 | Parla .................. | H04L 63/0272 726/15 |
| 2017/0237765 A1* | 8/2017 | Oberheide .......... | H04L 63/1433 726/4 |

FOREIGN PATENT DOCUMENTS

| | | |
|---|---|---|
| JP | 2013-242282 A | 12/2013 |
| WO | WO-2007/108124 A1 | 9/2007 |

OTHER PUBLICATIONS

Vissicchio, Stefano, Laurent Vanbever, and Jennifer Rexford. "Sweet little lies: Fake topologies for flexible routing." proceedings of the 13th ACM Workshop on Hot Topics in Networks. ACM, 2014, pp. 1-7.. (Year: 2014).*

International Search Report corresponding to PCT/JP2015/000696, dated May 12, 2015 (3 pages).

Written Opinion corresponding to PCT/JP2015/000696, dated May 12, 2015 (7 pages).

\* cited by examiner

Fig. 4

| FAKE NETWORK CONFIGURATION INFORMATION | | | LEGITIMATE NETWORK CONFIGURATION INFORMATION | | |
|---|---|---|---|---|---|
| NAME | IP ADDRESS | MAC ADDRESS | NAME | IP ADDRESS | MAC ADDRESS |
| asdfjkl | 10.56.50.10 | 00:11:22:33:44:55 | pepper | 172.16.1.1 | xx:xx:xx:xx:xx:xx |
| qweruio | 211.251.10.55 | 66:77:88:99:aa:bb | wasabi | 172.16.1.2 | yy:yy:yy:yy:yy:yy |
| zxcvbnm | 99.87.66.54 | cc:dd:ee:ff:00:11 | ginger | 172.16.1.3 | zz:zz:zz:zz:zz:zz |
| ... | ... | ... | ... | ... | ... |

Fig. 6

| FAKE NETWORK CONFIGURATION INFORMATION | | | | LEGITIMATE NETWORK CONFIGURATION INFORMATION | | | |
|---|---|---|---|---|---|---|---|
| NAME | IP ADDRESS | MAC ADDRESS | PORT NUMBER | NAME | IP ADDRESS | MAC ADDRESS | PORT NUMBER |
| asdfjkl | 10.56.50.10 | 00:11:22:33:44:55 | 123 | pepper | 172.16.1.1 | xx:xx:xx:xx:xx:xx | 80 |
| qweruio | 211.251.10.55 | 66:77:88:99:aa:bb | 6315 | wasabi | 172.16.1.2 | yy:yy:yy:yy:yy:yy | 443 |
| zxcvbnm | 99.87.66.54 | cc:dd:ee:ff:00:11 | 29053 | ginger | 172.16.1.3 | zz:zz:zz:zz:zz:zz | 23 |
| ... | ... | ... | ... | ... | ... | ... | ... |

Fig. 7

| RULE | ACTION |
|---|---|
| pepper->ginger | allow |
| pepper->wasabi | deny |
| ... | ... |

Fig. 8

| FAKE NETWORK CONFIGURATION INFORMATION | | | LEGITIMATE NETWORK CONFIGURATION INFORMATION | |
|---|---|---|---|---|
| NAME | IP ADDRESS | MAC ADDRESS | TERMINAL SPECIFICATION INFORMATION | GROUP |
| asdfjkl | 10.56.50.10 | 00:11:22:33:44:55 | pepper | aaa |
| qweruio | 211.251.10.55 | 66:77:88:99:aa:bb | wasabi | aaa |
| zxcvbnm | 99.87.66.54 | cc:dd:ee:ff:00:11 | ginger | bbb |
| ... | ... | ... | ... | ... |

NETWORK MANAGEMENT APPARATUS, NETWORK MANAGEMENT METHOD, AND RECORDING MEDIUM

CROSS-REFERENCE TO RELATED APPLICATIONS

This application is a national stage application of International Application No. PCT/JP2015/000696 entitled "Network Management Device, Network System, Network Management Method, and Recording Medium," filed on Feb. 16, 2015, which claims the benefit of the priority of Japanese Patent Application No. 2014-049856, filed on Mar. 13, 2014, the disclosures of each of which are hereby incorporated by reference in their entirety.

TECHNICAL FIELD

The present invention relates to a network management apparatus, a network system, a network management method, and a recording medium.

BACKGROUND ART

Recent years, protective measures against cyberattacks and the like have been developed.

For example, in PTL 1, a technology in which a large amount of fake data are leaked to a distributed network as information transmitted to each other on the distributed network and information stored in distributed nodes is disclosed. The technology in PTL 1 makes it difficult for network users and the data acquisition side of the distributed network to determine the authenticity of respective information and files.

CITATION LIST

Patent Literature

PTL 1: Japanese Patent Application Laid-open Publication No. 2010-97343

SUMMARY OF INVENTION

Technical Problem

When a malicious third party has already intruded into a network through a cyberattack, there is a possibility that the third party infers network configuration information of another terminal connected to the same network by using the network configuration information, such as an IP (Internet Protocol) address, of an intruded terminal and accesses the another terminal in an unauthorized manner.

The effect of the technology disclosed in PTL 1 is limited only to making the authenticity determination of data flowing on the network difficult, and no countermeasure against unauthorized access from an intruded terminal using the network configuration information of the terminal is considered.

The present invention is made in consideration of the above-described problem, and an object of the present invention is to achieve a network management apparatus, a network system, a network management method, and a recording medium that enables prevention of unauthorized access from a terminal into which a malicious user has intruded to another apparatus.

Solution to Problem

A network management apparatus according to one exemplary aspect of the present invention that connects to a terminal by way of a communication apparatus, includes: legitimate information generation means for generating legitimate identification information that is identification information to identify the terminal on a network that the network management apparatus manages, the legitimate identification information being managed as legitimate information by the network management apparatus; fake information generation means for generating fake identification information that is different from the legitimate identification information and that cannot be used as it is for communication with another terminal; management means for managing the legitimate identification information and the fake identification information in association with each other; and registration means for registering the fake identification information to the terminal.

A network system according to one exemplary aspect of the present invention includes: a plurality of terminals; a network management apparatus that manages a network; and a communication apparatus that connects each of the plurality of terminals to the network management apparatus, wherein the network management apparatus includes: legitimate information generation means for generating, for a terminal, among the plurality of terminal, that is connected to the network management apparatus by way of the communication apparatus, legitimate identification information that is identification information to identify each of the plurality of terminals on a network that the network management apparatus manages, the legitimate identification information being managed as legitimate information by the network management apparatus; fake information generation means for generating, for a terminal connected to the network, fake identification information that is different from the legitimate identification information and that the terminal cannot use as it is for communication with another terminal; management means for managing the legitimate identification information and the fake identification information in association with each other; and registration means for registering the fake identification information to the terminal connected to the network.

A network management method according to one exemplary aspect of the present invention for a network management apparatus that connects to a terminal by way of a communication apparatus, includes: generating legitimate identification information that is identification information to identify the terminal on a network that the network management apparatus manages, the legitimate identification information being managed as legitimate information by the network management apparatus; generating fake identification information that is different from the legitimate identification information and that cannot be used as it is for communication with another terminal; managing the legitimate identification information and the fake identification information in association with each other; and registering the fake identification information to the terminal.

A computer program to be installed in a computer to achieve the above-described network management apparatus or the above-described network management method and a computer-readable storage medium storing the computer program are also included in the scope of the present invention.

Advantageous Effects of Invention

The present invention provides an advantageous effect of enabling prevention of unauthorized access from a terminal into which a malicious user has intruded to another apparatus.

BRIEF DESCRIPTION OF DRAWINGS

FIG. 4 is a diagram illustrating an example of data stored in a network configuration information storage unit of a network management apparatus according to the second exemplary embodiment of the present invention.

FIG. 6 is a diagram illustrating an example of data stored in a network configuration information storage unit of a network management apparatus according to a variation of the second exemplary embodiment of the present invention.

FIG. 7 is a diagram illustrating an example of relation information and action information managed by a network configuration information management unit of a network management apparatus according to a third exemplary embodiment of the present invention.

FIG. 8 is a diagram illustrating an example of data stored in a network configuration information storage unit of a network management apparatus according to a fourth exemplary embodiment of the present invention.

DESCRIPTION OF EMBODIMENTS

<First Exemplary Embodiment>

Figure 1:
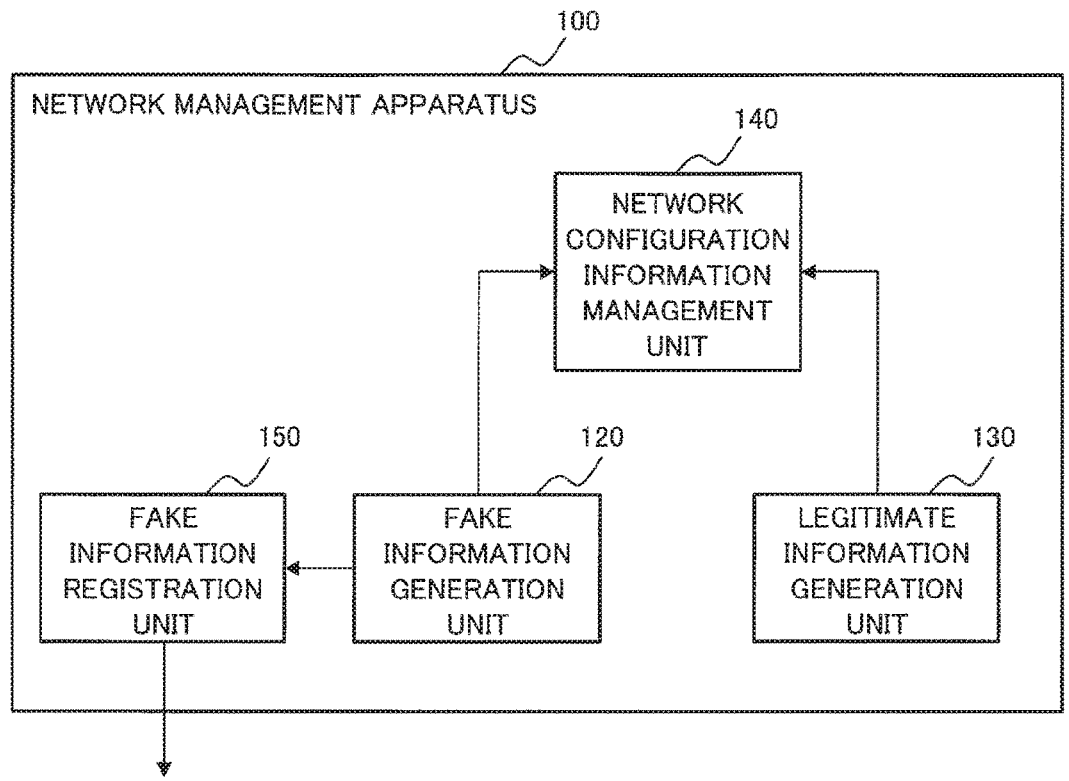
FIG. 1 is a functional block diagram illustrating an example of a functional configuration of a network management apparatus according to a first exemplary embodiment of the present invention.

A first exemplary embodiment of the present invention will be described in detail with reference to the drawings. FIG. 1 is a functional block diagram illustrating an example of a functional configuration of a network management apparatus 100 according to the first exemplary embodiment of the present invention. The network management apparatus 100 is an apparatus that manages a configuration of a network. The network management apparatus 100 is achieved by means of, for example, an SDN (Software-Defined Networking) controller and the like.

Figure 2:
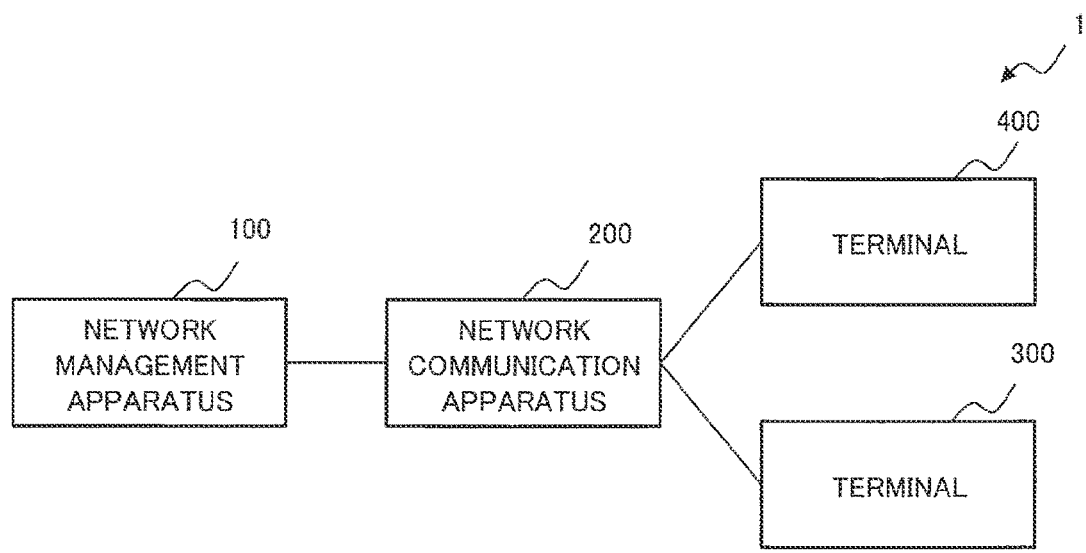
FIG. 2 is a block diagram illustrating an example of a configuration of a network system according to the first exemplary embodiment of the present invention.

A network system 1 including the network management apparatus 100 will now be described with reference to FIG. 2. FIG. 2 is a diagram illustrating an example of a configuration of the network system 1 according to the exemplary embodiment. As illustrated in FIG. 2, the network system 1 includes the network management apparatus 100, a network communication apparatus 200, and a plurality of terminals (300 and 400).

The network management apparatus 100 is connected to the terminals (300 and 400) by way of the network communication apparatus 200.

The network communication apparatus 200 is an apparatus that connects the network management apparatus 100 and the respective terminals. The network communication apparatus 200 is achieved by means of, for example, an SDN switch. Although, in the exemplary embodiment, a configuration in which one network communication apparatus 200 is included is described, the exemplary embodiment is not limited to the configuration. A plurality of network communication apparatuses 200 may be included.

The plurality of terminals (300 and 400) are user terminals, servers, or the like that perform communication with one another by way of the network communication apparatus 200. Although, in FIG. 2, two terminals are connected to the network communication apparatus 200, the number of terminals is not limited to two.

When a terminal is connected to the network communication apparatus 200, the terminal transmits an IP (Internet Protocol) address and MAC (Media Access Control) address of its own to the network communication apparatus 200. The information that a terminal transmits to the network communication apparatus 200 is not limited to such information and may be, for example, a host name (hereinafter, also referred to as NAME).

(Network Management Apparatus 100)

The network management apparatus 100 includes a fake information generation unit 120, a legitimate information generation unit 130, a network configuration information management unit 140, and a fake information registration unit 150, as illustrated in FIG. 1.

(Legitimate Information Generation Unit 130)

The legitimate information generation unit 130 generates legitimate network configuration information (legitimate identification information), which the network management apparatus 100 manages as legitimate information, for a terminal connected to the network management apparatus 100 (connected terminal) by way of the network communication apparatus 200 among the plurality of terminals (300 and 400). The legitimate network configuration information is information by which a terminal is identified on the network that the network management apparatus 100 manages. The legitimate network configuration information is information that can be used as it is when, for example, the above-described terminal performs communication with another terminal connected to the network management apparatus 100. While the information that can be used as it is includes, for example, an IP address, MAC address, and host name, the exemplary embodiment is not limited thereto.

Legitimate network configuration information that the legitimate information generation unit 130 generates may be generated in accordance with information that has been set by an administrator in advance or automatically generated using another method. The generation method by which the legitimate information generation unit 130 generates legitimate network configuration information is not limited to any specific method.

The legitimate information generation unit 130 supplies the network configuration information management unit 140 with the generated legitimate network information.

(Fake Information Generation Unit 120)

The fake information generation unit 120 generates fake (trap) network configuration information (fake identification information) for a connected terminal, which is connected to the network management apparatus 100 by way of the network communication apparatus 200, among the plurality of terminals (300 and 400). The fake network configuration information is information that is different from legitimate network configuration information and that the network management apparatus 100 manages as fake information. The fake network configuration information is random information. The fake network configuration information is information that cannot be used as it is when a terminal performs communication with another terminal. Furthermore, the fake network configuration information is information that corresponds to legitimate network configuration information on one-on-one basis, not in a duplicate manner. While the fake network configuration information includes, for example, a randomly generated host name, IP address, and MAC address, the exemplary embodiment is not limited thereto.

The fake information generation unit 120 supplies the network configuration information management unit 140 and the fake information registration unit 150 with the generated fake network configuration information. The fake information generation unit 120 may be configured to generate fake network configuration information in accordance with a predetermined rule instead of at random.

(Network Configuration Information Management Unit 140)

The network configuration information management unit 140 is a means that manages fake network configuration information and legitimate network configuration information in association with each other. The network configuration information management unit 140 may store the above two network configuration information in association with each other in a not-illustrated storage means.

(Fake Information Registration Unit 150)

Upon receiving fake network configuration information from the fake information generation unit 120, the fake information registration unit 150 registers the fake network configuration information to a terminal. For example, when the fake network configuration information that the fake information generation unit 120 has generated is an IP address, a MAC address, and a host name, the fake information registration unit 150 registers the IP address, MAC address, and host name to a terminal that is connected to the network management apparatus 100. When network configuration information has already been registered to the terminal, the fake information registration unit 150 may overwrite the already-registered network configuration information with the fake network configuration information supplied from the fake information generation unit 120.

(Advantageous Effect)

The network management apparatus 100 according to the exemplary embodiment enables prevention of unauthorized access from a terminal into which a malicious user has intruded to another terminal.

That is because the fake information registration unit 150 registers fake network configuration information generated by the fake information generation unit 120 to each connected terminal. This processing causes network configuration information that is registered to each terminal connected to the network management apparatus 100 to become fake network configuration information, which is different from legitimate network configuration information. Therefore, even if a terminal connected to the network management apparatus 100 is infected, inferring the network configuration information of a nearby apparatus based on the fake network configuration information is difficult. Thus, the network management apparatus 100 according to the exemplary embodiment makes it difficult to perform malicious activities and enables a higher safety level to be achieved for the network.

In addition, generating legitimate network configuration information enables the network management apparatus 100 to suitably manage terminals connected to the network management apparatus 100.

Furthermore, according to the exemplary embodiment, the network configuration information management unit 140 of the network management apparatus 100 manages legitimate network configuration information and fake network configuration information in association with each other. This configuration, when a terminal to which fake network configuration information is registered by the fake information registration unit 150 performs communication with another terminal, enables the network management apparatus 100 to specify the legitimate network configuration information of the terminal easily.

<Second Exemplary Embodiment>

A second exemplary embodiment of the present invention will be described in detail with reference to the drawings. The same reference signs are assigned to components having the same functions as those of components included in the drawings described in the first exemplary embodiment and a detailed description thereof will be omitted.

Figure 3:
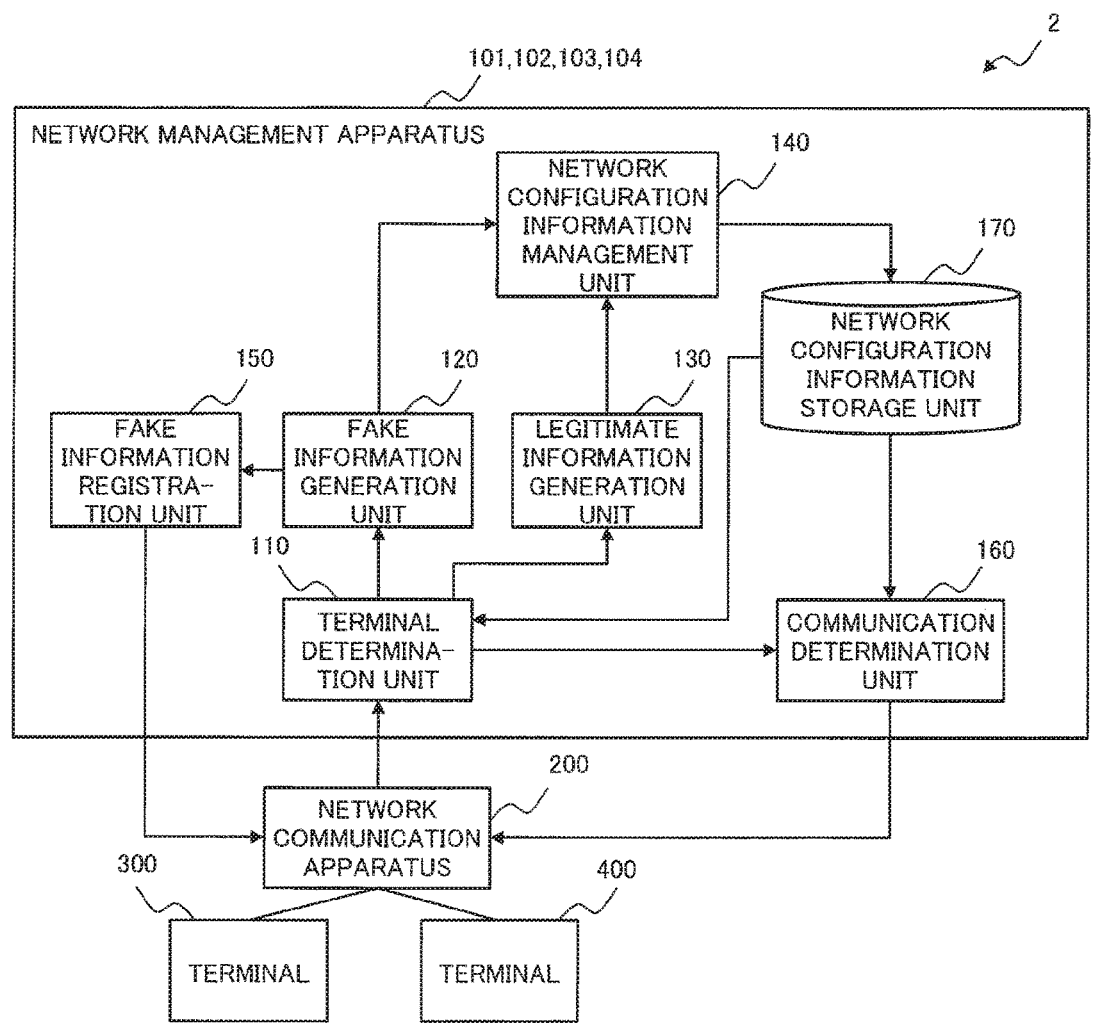
FIG. 3 is a block diagram illustrating an example of a configuration of a network system according to a second exemplary embodiment of the present invention.

FIG. 3 is a functional block diagram illustrating an example of a functional configuration of a network management apparatus 101 in a network system 2 according to the exemplary embodiment. As illustrated in FIG. 3, the network management apparatus 101 includes a terminal determination unit (first determination means) 110, a fake information generation unit 120, a legitimate information generation unit 130, a network configuration information management unit 140, a fake information registration unit 150, a communication determination unit (second determination means) 160, and a network configuration information storage unit 170.

(Terminal Determination Unit 110)

The terminal determination unit 110 determines whether a terminal connected to the network communication apparatus 200 is a terminal newly connected to the network communication apparatus 200 or a terminal having been connected to the network communication apparatus 200 previously.

Specifically, the terminal determination unit 110 receives packets (input packets), which include information (terminal identification information) for identifying the terminal connected to the network communication apparatus 200 and information (destination identification information) for identifying another terminal with which the terminal performs communication, from the terminal by way of the network communication apparatus 200.

Although, in the exemplary embodiment, a description will be made taking, for example, an IP address (IP src) and a MAC address (Ether src) as examples of terminal identification information, the exemplary embodiment is not limited thereto. The terminal identification information may be, for example, a host name (hereinafter, also referred to as NAME) that indicates the terminal. The terminal identification information may also be, for example, at least any of an IP address, a MAC address, and a host name. In the exemplary embodiment, a description will be made taking, as an example, a case in which an IP address and MAC address of a terminal are input to the terminal determination unit 110 as terminal identification information.

Although the destination identification information includes, for example, a destination IP address (IP dst), a destination MAC address (Ether dst), and a host name, the exemplary embodiment is not limited thereto. The destination identification information may be, for example, at least any of an IP address, a MAC address, and a host name. In the exemplary embodiment, a description will be made taking, as an example, a case in which an IP address and MAC address of a destination terminal are input to the terminal determination unit 110 as the destination identification information.

In the exemplary embodiment, an operation of transmitting the input packets that the network communication apparatus 200 has received to the network management apparatus 101 is also referred to as pkt_in. In the input packets, for example, information itemized as the following (1) to (8) may be included:
(1) a physical port number of the network communication apparatus 200;
(2) a type of an Ethernet (registered trademark);
(3) an ID (IDentifier) of a VLAN (Virtual LAN (Local Area Network));
(4) a priority control value of the VLAN;
(5) a protocol type of the IP;
(6) ToS (Type Of Service) information of the IP;
(7) a source port number of the TCP/UDP (Transmission Control Protocol/User Datagram Protocol); and
(8) a destination port number of the TCP/UDP.

The terminal determination unit 110 confirms whether an IP address and a MAC address, which are the received terminal identification information, are managed by the network configuration information management unit 140. That is, the terminal determination unit 110 confirms whether an IP address and a MAC address, which are the terminal identification information, are stored in the network configuration information storage unit 170. When the terminal identification information is not managed by the network configuration information management unit 140, the terminal determination unit 110 determines that the connected terminal is a terminal newly connected to the network communication apparatus 200. The terminal determination unit 110 supplies the fake information generation unit 120 and the legitimate information generation unit 130 with the terminal identification information included in the input packets. The terminal determination unit 110 may supply the fake information generation unit 120 with information indicating that input packets have been received.

When the terminal identification information is managed by the network configuration information management unit 140, the terminal determination unit 110 determines that the connected terminal is a terminal that has been connected to the network communication apparatus 200 previously. The terminal determination unit 110 supplies the communication determination unit 160 with the received input packets including the terminal identification information and the destination identification information.

A case will be described in which, for example, an IP address and MAC address are transmitted as terminal identification information from the network communication apparatus 200 and no information (for example, IP address) for connecting to the network has been set to a terminal connected to the network communication apparatus 200.

In this case, when the terminal is connected to the network communication apparatus 200, the IP address of the terminal identification information with the empty status is transmitted to the terminal determination unit 110. The terminal determination unit 110 may confirm whether the terminal is a newly connected terminal by means of confirming whether the IP address is empty.

(Communication Determination Unit 160)

When the terminal determination unit 110 determines that a terminal connected to the network management apparatus 101 (referred to as a connected terminal) is not a newly connected terminal, the communication determination unit 160 determines whether the connected terminal is communicable with another terminal connected to the network management apparatus 101 (referred to as a destination terminal). Specifically, based on the terminal identification information and the destination identification information included in input packets, the communication determination unit 160, referring to information managed by the network configuration information management unit 140 (that is, information stored in the network configuration information storage unit 170), determines communicability between the terminals.

The communication determination unit 160 receives the input packets from the terminal determination unit 110, the input packets including the terminal identification information and the destination identification information and received by the terminal determination unit 110. The communication determination unit 160, referring to the network configuration information storage unit 170, specifies a legitimate IP address and MAC address (legitimate network configuration information) based on the IP address and MAC address included in the received terminal identification information.

Next, the communication determination unit 160 confirms whether the connected terminal, which is connected to the network communication apparatus 200, is a terminal that is communicable with the destination terminal, with which the terminal is to perform communication. When the destination identification information (IP address and MAC address) included in the input packets that the communication determination unit 160 has received from the terminal determination unit 110 is fake network configuration information, the communication determination unit 160, using the destination identification information, refers to the network configuration information storage unit 170 to specify a legitimate IP address and MAC address corresponding to the destination identification information.

Next, the communication determination unit 160, using the legitimate network configuration information of the connected terminal and the legitimate network configuration information of the destination terminal, confirms whether the connected terminal and the destination terminal are communicable with each other. For example, the communication determination unit 160 confirms whether the connected terminal and the destination terminal belong to the same subnet.

When the connected terminal and the destination terminal are not communicable with each other, the communication determination unit 160 discards the input packets. When the connected terminal and the destination terminal are communicable with each other, the communication determination unit 160 performs processing of the input packets (registers a flow for transmitting the input packets to the destination terminal) to the network communication apparatus 200. In the exemplary embodiment, the processing is also referred to as flow_mod.

Next, the communication determination unit 160 transmits (transfers) the input packets to the destination terminal. Alternatively, the communication determination unit 160 transmits the input packet to the network communication apparatus 200, which transmits the input packets to the destination terminal. In the exemplary embodiment, the transmission processing is also referred to as pkt_out.

When the terminal identification information transmitted from the terminal does not include an IP address, the communication determination unit 160 may be configured to confirm whether the terminals belong to the same subnet based on terminal identification information other than IP addresses (for example, host names). For example, a configuration may be included in which a list of host names of terminals belonging to the same subnet is stored in the network configuration information storage unit 170, and the communication determination unit 160 confirms whether the terminals belong to the same subnet by consulting the list.

(Network Configuration Information Storage Unit 170)

The network configuration information storage unit 170 is a means for storing fake network configuration information and legitimate network configuration information, which are associated with each other. The network configuration information storage unit 170 is managed by the network configuration information management unit 140. Although, in the exemplary embodiment, a configuration in which the network configuration information storage unit 170 is included in the network management apparatus 101 will be described, the network configuration information storage unit 170 may be achieved by an apparatus separate from the network management apparatus 101.

With reference to FIG. 4, network configuration information stored in the network configuration information storage unit 170 will now be described. FIG. 4 is a diagram illustrating an example of data stored in the network configuration information storage unit 170 of the network management apparatus 101 according to the exemplary embodiment. As illustrated in FIG. 4, legitimate network configuration information and fake network configuration information, which is different from the legitimate network configuration information, are stored in association with each other in the network configuration information storage unit 170.

A case will be described in which, for example, to a terminal connectable to the network that is connected to the network communication apparatus 200, no information for connecting to the network (for example, a host name and IP address) has been set. It is assumed that the terminal is a terminal that is newly connected to the network communication apparatus 200. Since the terminal has a MAC address, the terminal, when first connected to the network communication apparatus 200, transmits input packets including the MAC address as terminal identification information to the network communication apparatus 200. On this occasion, the terminal may transmit terminal identification information having empty information as an IP address.

It is assumed that the MAC address transmitted from the terminal is "xx:xx:xx:xx:xx:xx". At this time, the fake information generation unit 120 generates, at random, a fake host name, a fake IP address, and a fake MAC address individually for the terminal. For example, the fake information generation unit 120 generates "asdfjkl", "10.56.50.10", and "00:11:22:33:44:55" as a fake host name, a fake IP address, and a fake MAC address, respectively.

The legitimate information generation unit 130 generates a legitimate host name and a legitimate IP address. With regard to the MAC address, the received MAC address serves as a legitimate MAC address. For example, the legitimate information generation unit 130 generates "pepper" and "172.16.1.1" as a legitimate host name and a legitimate IP address, respectively.

In the network configuration information storage unit 170, the fake network configuration information and the legitimate network configuration information are stored in association with each other by the network configuration information management unit 140. Thus, in the network configuration information storage unit 170, the fake network configuration information generated by the fake information generation unit 120 and the legitimate network configuration information generated by the legitimate information generation unit 130 are stored in association with each other, as illustrated in the first row in FIG. 4.

Another case will be described in which, to a terminal connectable to the network that is connected to the network communication apparatus 200, information for connecting to the network has been set. It is assumed that the terminal is a terminal that is newly connected to the network communication apparatus 200. The terminal, when first connected to the network communication apparatus 200, transmits input packets including the already-set IP address and MAC address as terminal identification information to the network communication apparatus 200.

Since the terminal is a terminal that is newly connected to the network communication apparatus 200, the fake information generation unit 120 generates, at random, a fake host name, a fake IP address, and a fake MAC address individually for the terminal. The legitimate information generation unit 130 generates a legitimate host name and a legitimate IP address. With regard to the MAC address, the received MAC address serves as a legitimate MAC address. When the received IP address and host name are an IP address and host name that are usable (that the network management apparatus 101 is able to manage) on the network that the network management apparatus 101 manages, the legitimate information generation unit 130 may set the received IP address and host name as a legitimate IP address and a legitimate host name, respectively.

Next, by the network configuration information management unit 140, the fake network configuration information and the legitimate network configuration information are stored in association with each other in the network configuration information storage unit 170.

(Processing of Network Management Apparatus 101)

Figure 5:
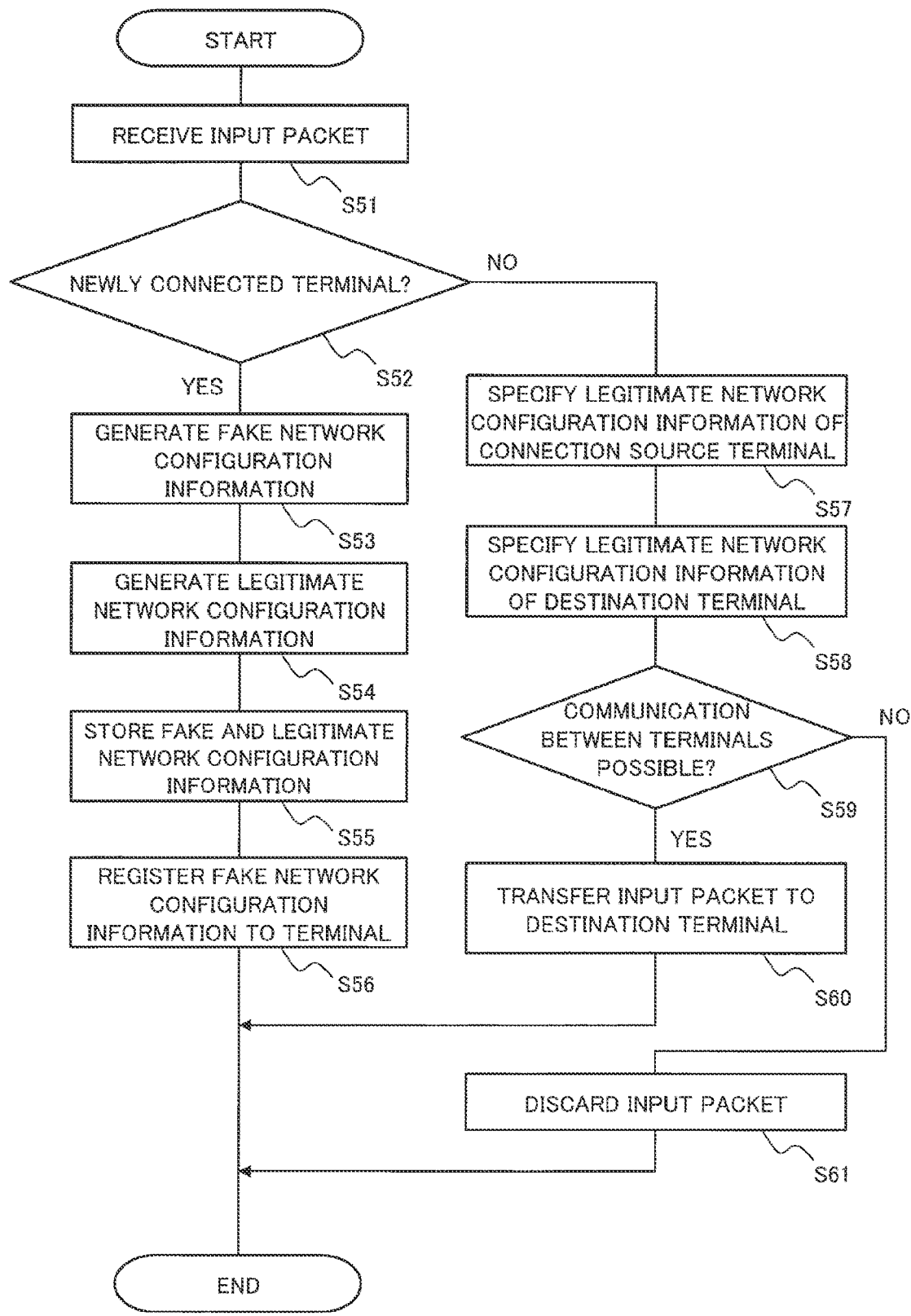
FIG. 5 is a flowchart illustrating an example of a process flow of the network management apparatus according to the second exemplary embodiment of the present invention.

Next, with reference to FIG. 5, a processing flow of the network management apparatus 101 will be described. FIG. 5 is a flowchart illustrating an example of processing flow of the network management apparatus 101. When a terminal 300 is connected to the network communication apparatus 200 and the network communication apparatus 200 transmits input packets to the network management apparatus 101, the network management apparatus 101 performs processing in steps S51 to S61 below, as illustrated in FIG. 5.

Step S51: The terminal determination unit 110 receives the input packets including terminal identification information and destination identification information.

Step S52: The terminal determination unit 110 confirms whether the terminal indicated by the terminal identification information, which is received in step S51, is a terminal that is newly connected to the network communication apparatus 200. When the terminal is a newly connected terminal (in the case of YES), the process proceeds to step S53. When the terminal is a terminal that has already been connected (in the case of NO), the process proceeds to step S57.

Step S53: The fake information generation unit 120 generates fake network configuration information.

Step S54: The legitimate information generation unit 130 generates legitimate network configuration information.

The processing in steps S53 and S54 may be performed at the same time or in the reverse order.

Step S55: The network configuration information management unit 140 stores the legitimate network configuration information generated in step S54 and the fake network configuration information generated by the fake information generation unit 120 in step S53 in association with each other in the network configuration information storage unit 170.

Step S56: The fake information registration unit 150 registers the fake network configuration information generated by the fake information generation unit 120 in step S53 to the terminal that has transmitted the input packets, and the process is finished.

The processing in step S56 may be performed at the same time as the processing in step S54 or before the processing in step S54.

Step S57: When the confirmation result in step S52 is NO, the communication determination unit 160, referring to the network configuration information storage unit 170, specifies the legitimate network configuration information of the connected terminal based on the terminal identification information received in step S51.

Step S58: The communication determination unit 160, referring to the network configuration information storage unit 170, specifies the legitimate network configuration information of the destination terminal based on the destination identification information received in step S51.

Step S59: The communication determination unit 160 determines communicability between the terminals. When the terminals are communicable with each other (in the case of YES), the process proceeds to step S60. When not communicable (in the case of NO), the process proceeds to step S61.

Step S60: The communication determination unit 160 registers a flow for transmitting the input packets to the destination terminal to transfer the input packets to the destination terminal, and the process is finished.

Step S61: The communication determination unit 160 discards the input packets, and the process is finished.

(Advantageous Effects)

The network management apparatus 101 according to the exemplary embodiment enables prevention of unauthorized access from a terminal into which a malicious user has intruded to another terminal.

That is because the fake information registration unit 150 registers fake network configuration information generated by the fake information generation unit 120 to a connected terminal. The registration brings network configuration information that is registered to the terminal connected to the network management apparatus 101 into the fake network configuration information, which is different from legitimate network configuration information.

Therefore, the network management apparatus 101 according to the exemplary embodiment enables making it difficult for malicious software, such as a virus lurking in a terminal, to acquire legitimate network configuration information.

Even if a terminal connected to the network management apparatus 101 is infected, inferring the network configuration information of a nearby apparatus based on fake network configuration information is difficult. For example, it is assumed that a terminal connected to the network management apparatus 101 is infected with a worm or the like and performs an attack specifying, as a destination terminal, network configuration information that can be supposed from fake network configuration information set to the terminal itself (for example, an IP address that is included in the same subnet as the fake IP address of the terminal). However, since the fake network configuration information is network configuration information generated at random, the supposable network configuration information is not managed by the network configuration information management unit 140. In this way, the network management apparatus 101 according to the exemplary embodiment can make it difficult to infer the network configuration information of another terminal.

Because the inference of the network configuration information of another terminal connected to the network communication apparatus 200 becomes difficult, it makes possible to increase the number of hours (operation cost) required for the search activity for another terminal. The increased number of hours (cost) enables making it difficult to perform malicious activity from the infected terminal. Thus, the network management apparatus 101 according to the exemplary embodiment makes such malicious activity difficult and enables a higher safety level to be achieved for the network.

The network management apparatus 101 according to the exemplary embodiment also enables making it difficult to perform search activity, such as hunting for a vulnerable terminal from which a malicious user can launch an attack. The attack includes additional intrusion into a nearby terminal of an infected terminal (secondary infection), information theft, and the like.

The generation of legitimate network configuration information enables the network management apparatus 101 to suitably manage terminals connected to the network management apparatus 101.

According to the exemplary embodiment, the network configuration information management unit 140 of the network management apparatus 101 manages the legitimate network configuration information and the fake network configuration information in association with each other. This configuration enables the network management apparatus 101, when a terminal to which fake network configuration information is registered by the fake information registration unit 150 performs communication with another terminal, to easily specify the legitimate network configuration information of the terminals.

Further, since the terminal determination unit 110 confirms whether a terminal connected to the network communication apparatus 200 is a newly connected terminal, the terminal determination unit 110 can register fake network configuration information into the newly connected terminal in response to the confirmation result. With regard to a terminal that has already been connected, input packets can be transmitted to a destination terminal with which the terminal performs communication while maintaining a security level.

(Variation)

Although a description was made using, as an example, a case in which legitimate network configuration information and fake network configuration information that the network configuration information management unit 140 according to the exemplary embodiment manages individually include an IP address, a MAC address, and a host name, the present invention is not limited to the case. Each of the legitimate network configuration information and the fake network configuration information may include a port number. In the variation, a configuration in which port numbers are included in the legitimate and fake network configuration information will be described with reference to FIG. 6.

FIG. 6 is a diagram illustrating an example of data stored in the network configuration information storage unit 170 according to the variation. As illustrated in FIG. 6, each record in the network configuration information storage unit 170 includes a host name, an IP address, a MAC address, and a port number as fake network configuration information. Each record in the network configuration information storage unit 170 also includes a host name, an IP address, a MAC address, and a port number as legitimate network configuration information.

As described above, terminal identification information is included in input packets that the terminal determination unit 110 receives from a terminal. In the network management apparatus 101 according to the variation, a source port number (simply referred to as a port number) is included in the terminal identification information.

For example, when a terminal having a MAC address of "xx:xx:xx:xx:xx:xx" performs communication using a port number (legitimate port number) of "80", the fake information generation unit 120 generates "123" as a fake port number corresponding to the legitimate port number. The fake information registration unit 150 makes, to the terminal, such a setting that the port number of a port to be used for the communication, in which a port number of "80" is actually used, is "123".

The terminal determination unit 110 confirms whether an IP address, a MAC address, and a port number that are the received terminal identification information are managed by the network configuration information management unit 140.

The communication determination unit 160 specifies the port number of a port that is used in performing communication with a destination terminal by means of referring to the network configuration information storage unit 170. For example, when the terminal determination unit 110 receives input packets in which the port number of the connected terminal is "123", the communication determination unit 160 refers to the network configuration information storage unit 170 to acquire a legitimate port number (in the case of FIG. 6, "80"). The communication determination unit 160, using the legitimate port number, transfers the input packets to the destination terminal.

As described above, setting a fake port number to a terminal causes ports that are usually opened, such as ports having port numbers of "80" and "443", to look closed from the terminal. Therefore, the network management apparatus 101 according to the variation enables making it more difficult to perform search activity including not only address scanning but also port scanning.

<Third Exemplary Embodiment>

A third exemplary embodiment of the present invention will be described in detail with reference to the drawings. In the above-described second exemplary embodiment, the communication determination unit 160 confirms whether a connected terminal and a destination terminal are communicable with each other by means of confirming whether the connected terminal and the destination terminal belong to the same subnet. The method to confirm whether a connected terminal and a destination terminal are communicable with each other, however, is not limited to the method. In the exemplary embodiment, another method to confirm whether a connected terminal and a destination terminal are communicable with each other will be described. The same reference signs are assigned to components having the same functions as those of components included in the drawings described in the above-described second exemplary embodiment and a detailed description thereof will be omitted.

A network management apparatus 102 according to the exemplary embodiment has the same functional configuration as the network management apparatus 101 according to the second exemplary embodiment illustrated in FIG. 3. The network management apparatus 102 includes a terminal determination unit 110, a fake information generation unit 120, a legitimate information generation unit 130, a network configuration information management unit 140, a fake information registration unit 150, a communication determination unit 160, and a network configuration information storage unit 170.

The network configuration information management unit 140, using legitimate network configuration information of terminals, manages relation information that indicates relations between terminals and action information that indicates actions between terminals indicated by the relation information in association with each other. Although, in the exemplary embodiment, a description will be made using, as an example, a case in which information managed by the network configuration information management unit 140 is stored in the network configuration information storage unit 170, the exemplary embodiment is not limited to the case. The information managed by the network configuration information management unit 140 may be stored in another not-illustrated storage apparatus.

The relation information and the action information associated with the relation information, which are managed by the network configuration information management unit 140, may be information that has been registered into the network configuration information storage unit 170 in advance or information that the legitimate information generation unit 130 generates. The method to generate the relation information and the action information associated with the relation information, which are managed by the network configuration information management unit 140, is not limited to any specific method.

With reference to FIG. 7, the relation information and the action information that the network configuration information management unit 140 manages will be described. FIG. 7 is a diagram illustrating an example of the relation information and the action information that the network configuration information management unit 140 manages. In FIG. 7, a piece of relation information and a piece of action information are referred to as a "rule" and an "action", respectively. In FIG. 7, as legitimate network configuration information, host names (NAMEs) are used. In FIG. 7, however, the legitimate network configuration information used in the relation information is not limited to host names.

As illustrated in FIG. 7, relation information defined using host names that are included in the legitimate network configuration information illustrated in FIG. 4 is included in the rule field. For example, relation information of communication between a terminal having a host name of "pepper" (assumed to be a terminal 300) and a terminal having a host name of "ginger" (assumed to be a terminal 400) is indicated by an arrow "→". The relation information indicates a relation in which the terminal 300 performs communication with the terminal 400. That is, it can also be said that the relation information indicates a rule of access from a terminal indicated by the network configuration information on the origin side of the arrow to a terminal indicated by the network configuration information on the tip side of the arrow.

In the action field, a character string of "allow" or "deny" is included. An action field entry having "allow" indicates that a rule associated with the action is allowed. An action field entry having "deny" indicates that a rule associated with the action is not allowed.

The information written in the "rule" and "action" fields is not limited to information in such a form as in FIG. 7 and may be information in any form as long as the information indicates relation information between terminals and action information associated with the relation information, respectively.

The communication determination unit 160, using the action information, determines whether a connected terminal connected to the network communication apparatus 200 is communicable with a destination terminal. As illustrated in FIG. 7, when a connected terminal has a host name of "pepper" and a destination terminal has a host name of "ginger", associated action information is "allow". Thus, the communication determination unit 160 determines that the connected terminal is communicable with the destination terminal. When a connected terminal has a host name of "pepper" and a destination terminal has a host name of "wasabi", associated action information is "deny". Thus, the communication determination unit 160 determines that the connected terminal is not communicable with the destination terminal.

As described above, the network management apparatus 102 according to the exemplary embodiment is capable of determining whether a connected terminal connected to the network communication apparatus 200 is communicable with a destination terminal without confirming whether the terminals belong to the same subnet. This capability enables whether a connected terminal is communicable with a destination terminal to be confirmed even when input packets do not include a destination IP address.

Therefore, the network management apparatus 102 according to the exemplary embodiment enables the same advantageous effect as those of the network management apparatus 101 according to the above-described second exemplary embodiment to be achieved.

<Fourth Exemplary Embodiment>

A fourth exemplary embodiment of the present invention will be described in detail with reference to the drawings. Although, in the above-described second exemplary embodiment, legitimate network configuration information generated by the legitimate information generation unit 130 is information that is usable as it is for communication on the network, such as an IP address, a MAC address, and a host name, the exemplary embodiment is not limited to the configuration. Legitimate network configuration information generated by a legitimate information generation unit 130 does not have to be information that is usable as it is for communication. In the exemplary embodiment, an example of the legitimate network configuration information generated by the legitimate information generation unit 130 will be described. The same reference signs are assigned to components having the same functions as those of components included in the drawings described in the above-described second exemplary embodiment and a detailed description thereof will be omitted.

A network management apparatus 103 according to the exemplary embodiment has the same functional configuration as the network management apparatus 101 according to the second exemplary embodiment illustrated in FIG. 3. The network management apparatus 103 includes a terminal determination unit 110, a fake information generation unit 120, a legitimate information generation unit 130, a network configuration information management unit 140, a fake information registration unit 150, a communication determination unit 160, and a network configuration information storage unit 170.

FIG. 8 is a diagram illustrating an example of data stored in the network configuration information storage unit 170 according to the exemplary embodiment. As illustrated in FIG. 8, legitimate network configuration information and fake network configuration information, which is different from the legitimate network configuration information, are stored in association with each other in the network configuration information storage unit 170.

In the exemplary embodiment, the legitimate network configuration information generated by the legitimate information generation unit 130 according to the exemplary embodiment is information that is identifiable only in the network management apparatus 103. The identifiable information is assumed to be, for example, a character string that uniquely specifies a terminal in the network management apparatus 103 (in FIG. 8, referred to as terminal specification information). Such a character string may be a host name or any character string as long as being manageable by the network management apparatus 103. Such a character string is assumed to be information corresponding to any of an IP address, a MAC address, and a host name, which are included in the legitimate network configuration information described in the above-described exemplary embodiments.

Furthermore, the legitimate information generation unit 130 generates information indicating a group to which a terminal indicated by the character string belongs as a component of the legitimate network configuration information. In FIG. 8, it is indicated that a terminal indicated by "pepper" belongs to a group having a group name of "aaa".

This group is equivalent to, for example, a subnet. The communication determination unit 160 confirms whether a connected terminal is communicable with a destination terminal, using information indicating a group in the legitimate network configuration information to which the connected terminal belongs and information indicating a group in the legitimate network configuration information to which the destination terminal belongs. For example, the communication determination unit 160 confirms whether the connected terminal and the destination terminal belong to the same group.

Based on the confirmation, the communication determination unit 160 is able to transmit input packets transmitted from the connected terminal to the destination terminal when the connected terminal is determined to be communicable with the destination terminal.

As described above, the network management apparatus 103 according to the exemplary embodiment enables whether a connected terminal is communicable with another terminal to be suitably confirmed even when the legitimate network configuration information of the connected terminal is not information, such as an IP address, that is directly used for communication with another terminal.

Therefore, the network management apparatus 103 according to the exemplary embodiment enables the same advantageous effects as those of the network management apparatus 101 according to the above-described second exemplary embodiment to be achieved.

(Variation)

The network management apparatus 103 according to the exemplary embodiment may confirm whether a connected terminal is communicable with a destination terminal, using information (relation information and action information) managed by the network configuration information management unit 140, which was described in the third exemplary embodiment, based on legitimate network configuration information generated in the exemplary embodiment. In this variation, such a method will be described. The same reference signs are assigned to components having the same functions as those of components included in the drawings described in the above-described exemplary embodiments and a detailed description thereof will be omitted.

A network management apparatus 104 according to the variation has the same functional configuration as the network management apparatus 101 according to the second exemplary embodiment illustrated in FIG. 3. The network management apparatus 104 includes a terminal determination unit 110, a fake information generation unit 120, a legitimate information generation unit 130, a network configuration information management unit 140, a fake information registration unit 150, a communication determination unit 160, and a network configuration information storage unit 170.

The network configuration information management unit 140 according to the variation manages character strings generated by the legitimate information generation unit 130 of the network management apparatus 103 according to the fourth exemplary embodiment as legitimate network configuration information and groups to which terminals indicated by the character strings belong (see FIG. 8).

The network configuration information management unit 140, using the legitimate network configuration information, also manages relation information that indicates relations between terminals and action information that indicates actions between terminals indicated by the relation information in association with each other (see FIG. 7).

The network configuration information storage unit 170 stores information managed by the network configuration information management unit 140. In the same manner as in the third exemplary embodiment, the relation information and the action information associated with the relation information may be stored in a storage apparatus different from the network configuration information storage unit 170.

As described above, the network management apparatus 104 according to the exemplary embodiment enables whether a connected terminal connected to the network communication apparatus 200 is communicable with a destination terminal to be suitably determined.

The relation information and the action information managed by the network configuration information management unit 140 according to the variation are not limited to relations and actions between terminals. The relation information may be, for example, information indicating relationships (1) between a terminal and a group to which another terminal belongs, (2) between a group to which a terminal belongs and the terminal, or (3) between a group to which a terminal belongs and a group to which another terminal belongs. The action information may be information indicating actions in association with the relation information. This configuration enables the communication determination unit 160 to more suitably determine whether a connected terminal is communicable with a destination terminal.

<Fifth Exemplary Embodiment>

A fifth exemplary embodiment of the present invention will be described in detail with reference to the drawings. The same reference signs are assigned to components having the same functions as those of components included in the drawings described in the above-described second exemplary embodiment and a detailed description thereof will be omitted.

Figure 9:
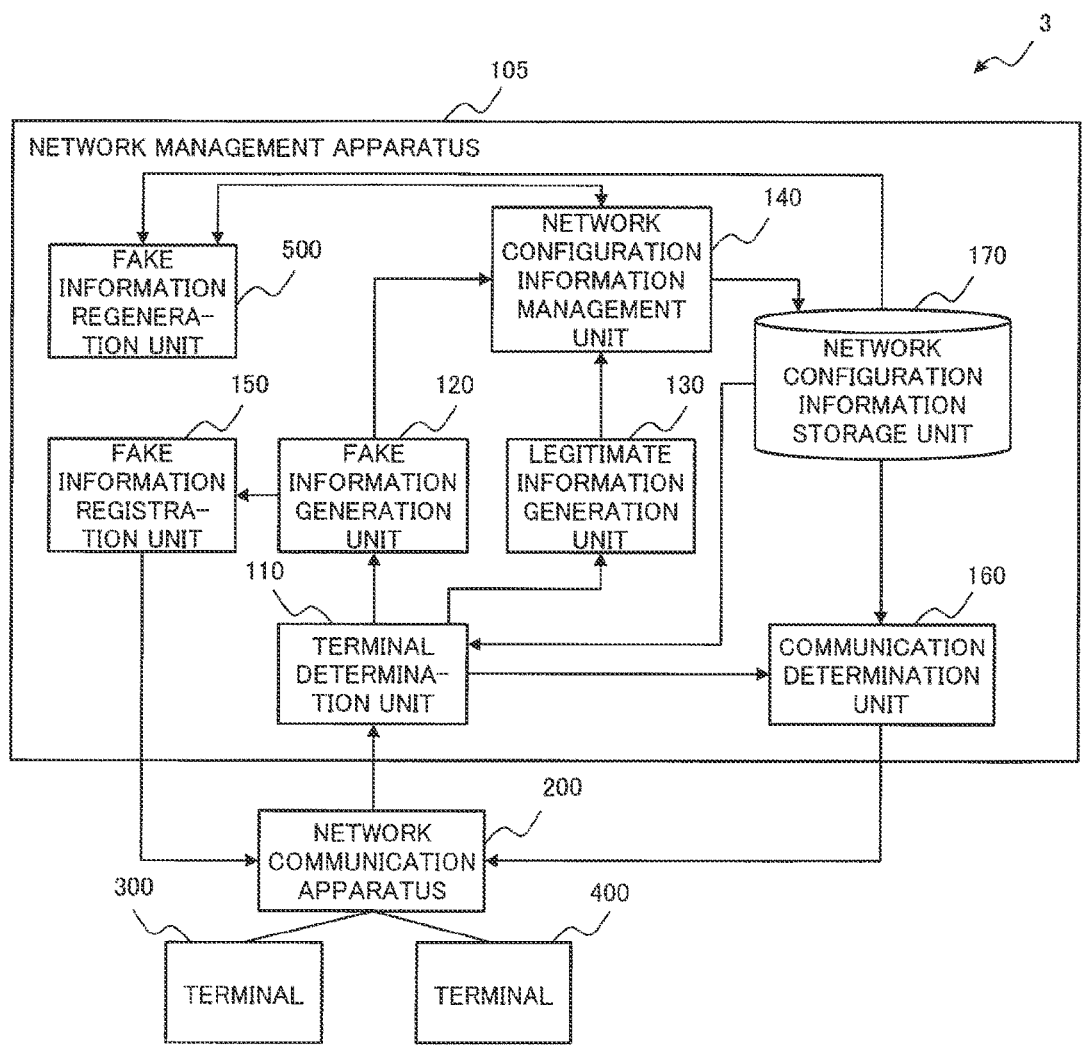
FIG. 9 is a block diagram illustrating an example of a configuration of a network system according to a fifth exemplary embodiment of the present invention.

FIG. 9 is a functional block diagram illustrating an example of a functional configuration of a network management apparatus 105 in a network system 3 according to the exemplary embodiment. As illustrated in FIG. 9, the network management apparatus 105 includes a terminal determination unit 110, a fake information generation unit 120, a legitimate information generation unit 130, a network configuration information management unit 140, a fake information registration unit 150, a communication determination unit 160, a network configuration information storage unit 170, and a fake information regeneration unit 500.

The fake information regeneration unit 500 is a means for, to change fake network configuration information at a predetermined time interval, generating new fake network configuration information at random at a regular or arbitrary timing for a terminal to which fake network configuration information subject to change has been registered. The fake information regeneration unit 500 may be configured to be generated new fake network configuration information by means of an administrator setting a period for changing fake network configuration information with a predetermined cycle to the network management apparatus 105. The fake information regeneration unit 500 may also be configured to be generated new fake network configuration information by means of the network configuration information management unit 140 or the fake information regeneration unit 500 setting a random cycle (period) automatically, or by means of another method.

Information indicating a subject terminal (subject terminal information) for which the fake information regeneration unit 500 generates new fake network configuration information may be supplied by the network configuration information management unit 140, or may be configured to be acquired by the fake information regeneration unit 500 from the network configuration information storage unit 170. The subject terminal information may be legitimate network configuration information or fake network configuration information of a subject terminal.

The fake information regeneration unit 500 supplies the generated new fake network configuration information, together with the subject terminal information, to the network configuration information management unit 140 and the fake information registration unit 150.

The network configuration information management unit 140 manages legitimate network configuration information indicating a terminal to which fake network configuration information subject to change has been registered and generated new fake network configuration information in association with each other. The network configuration information management unit 140 stores the associated network configuration information in the network configuration information storage unit 170.

Figure 10:
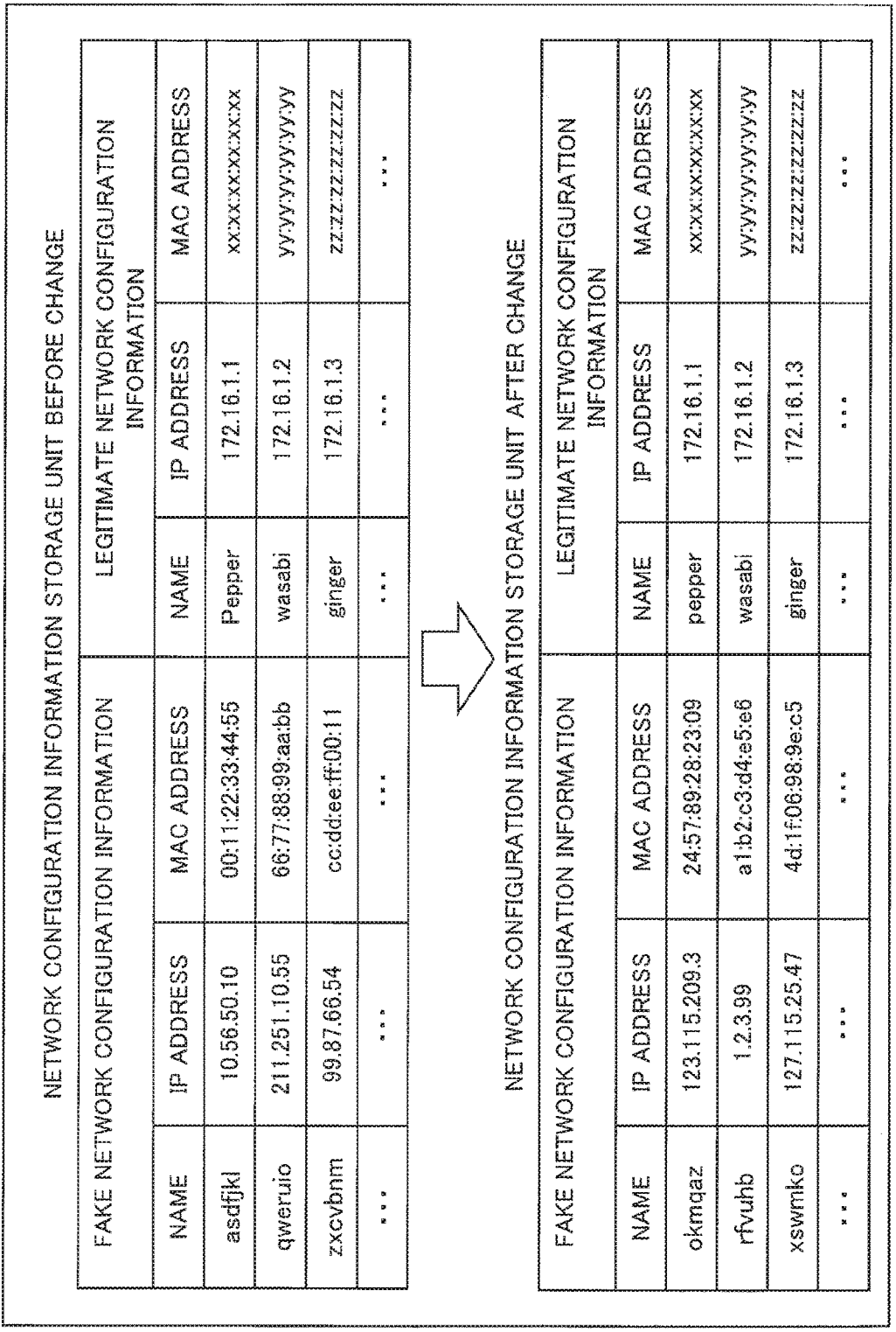
FIG. 10 is a diagram illustrating an example of data that are stored in a network configuration information storage unit of a network management apparatus according to the fifth exemplary embodiment of the present invention and are data before and after fake network configuration information is changed.

With reference to FIG. 10, data stored in the network configuration information storage unit according to the exemplary embodiment will now be described. FIG. 10 is a diagram illustrating an example of data, which are stored in the network configuration information storage unit 170 of the network management apparatus 105 according to the exemplary embodiment, before and after the change of fake network configuration information.

The upper table in FIG. 10 illustrates fake network configuration information and legitimate network configuration information before the fake network configuration information is changed. When new fake network configuration information is generated by the fake information regeneration unit 500, the network configuration information management unit 140 changes the pre-change fake network configuration information of terminals subject to change into the new fake network configuration information, as illustrated in the lower table in FIG. 10. Following the change, the network configuration information management unit 140 manages the new fake network configuration information and the legitimate network configuration information in association with each other.

For each terminal indicated by the subject terminal information supplied from the fake information regeneration unit 500, the fake information registration unit 150 changes fake network configuration information registered to the terminal to new fake network configuration information supplied from the fake information regeneration unit 500.

With this operation, connected terminals are able to change the fake network configuration information therein regularly.

The fake information regeneration unit 500 may generate new fake network configuration information, all at once, for all terminals that the network configuration information management unit 140 manages or are connected to the network communication apparatus 200 at a current time. Alternatively, the fake information regeneration unit 500 may generate, with respect to each predetermined group, new fake network configuration information for terminals belonging to the group at an interval predetermined for each of the group. The predetermined group may be, for example, a subnet or a group that the legitimate information generation unit 130 in the above-described fourth exemplary embodiment generates.

(Advantageous Effects)

Since the network management apparatus 105 according to the exemplary embodiment changes fake network configuration information registered to connected terminals regularly, it is possible to make malicious activities from an infected terminal difficult more suitably. Therefore, the network management apparatus 105 enables a higher safety level to be achieved for the network system 3.

The network management apparatus 105 according to the exemplary embodiment generates new fake network configuration information with respect to each predetermined group. Such a configuration enables the network management apparatus 105 to perform control in such a way as to update fake network configuration information at a short interval for a group including terminals more susceptible to attacks and not to update fake network configuration information often for a group including terminals immune to attacks. Therefore, the network management apparatus 105 enables a higher safety level to be achieved for the network system 3.

<Sixth Exemplary Embodiment>

A sixth exemplary embodiment of the present invention will be described with reference to the drawings. The same reference signs are assigned to components having the same functions as those of components included in the drawings described in the above-described first and second exemplary embodiments and a detailed description thereof will be omitted.

Figure 11:
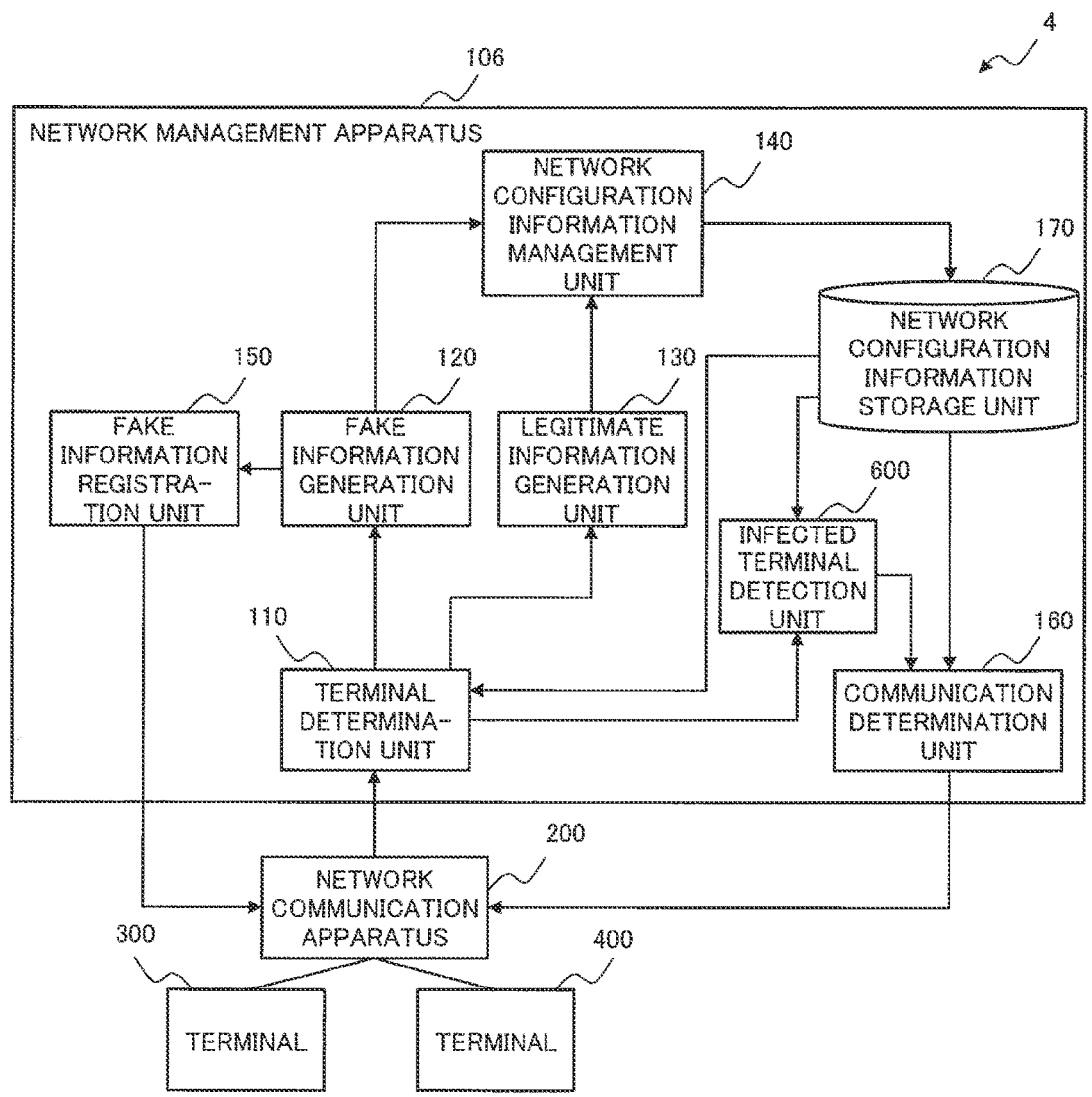
FIG. 11 is a block diagram illustrating an example of a configuration of a network system according to a sixth exemplary embodiment of the present invention.

FIG. 11 is a functional block diagram illustrating an example of a functional configuration of a network management apparatus 106 in a network system 4 according to the exemplary embodiment. As illustrated in FIG. 11, the network management apparatus 106 includes a terminal determination unit 110, a fake information generation unit 120, a legitimate information generation unit 130, a network configuration information management unit 140, a fake information registration unit 150, a communication determination unit 160, a network configuration information storage unit 170, and an infected terminal detection unit 600. While the network management apparatus 106 illustrated in FIG. 11 has a configuration in which the infected terminal detection unit 600 is further included in addition to the network management apparatus 101 of the second exemplary embodiment, the network management apparatus 106 may also have a configuration in which the infected terminal detection unit 600 is included in addition to a network management apparatus of any of the other exemplary embodiments.

(Infected Terminal Detection Unit 600)

When the terminal determination unit 110 determines that a connected terminal connected to the network management apparatus 106 is not a newly-connected terminal, the infected terminal detection unit 600 receives input packets that the terminal determination unit 110 has received from the terminal determination unit 110. The infected terminal detection unit 600 confirms whether destination identification information included in the received input packets is managed by the network configuration information management unit 140. Specifically, the infected terminal detection unit 600 confirms whether a destination IP address, MAC address, host name, and the like that are included in the destination identification information are stored in the network configuration information storage unit 170.

When the destination identification information is not managed by the network configuration information management unit 140, the infected terminal detection unit 600 detects that the connected terminal that has transmitted the input packets including the destination identification information has a high probability of being a terminal infected with malware (malware infected terminal). Subsequently, the infected terminal detection unit 600 disconnects the detected terminal from the network that the network management apparatus 106 manages. It is assumed that an existing method is used for the method to disconnect a terminal from the network, and a description thereof will thus be omitted in the exemplary embodiment.

When the destination identification information is managed by the network configuration information management unit 140, the infected terminal detection unit 600 supplies the communication determination unit 160 with the input packets received from the terminal determination unit 110.

The communication determination unit 160 determines whether the connected terminal is communicable with the destination terminal based on the input packets received from the infected terminal detection unit 600.

(Advantageous Effects)

As described above, according to the network management apparatus 106 according to the exemplary embodiment, the infected terminal detection unit 600 confirms whether destination identification information included in input packets that the terminal determination unit 110 has received is managed by the network configuration information management unit 140. When the destination identification information is not managed by the network configuration information management unit 140, the infected terminal detection unit 600 detects that the connected terminal is a malware infected terminal. The infected terminal detection unit 600 disconnects the connected terminal from the network.

Since the fake information registration unit 150 registers fake network configuration information to a connected terminal, inferring an IP address and MAC address of a nearby terminal around the connected terminal using the fake network configuration information is difficult. Thus, there is a probability that a malicious user transmits a search packet, from the connected terminal, to an arbitrary IP address or MAC address. Since, in an IPv4 (Internet Protocol Version 4) environment, for example, the total number of IP addresses therein is approximately 4.3 billion, searching for a nearby terminal in a pinpoint manner is difficult. Thus, there is a high probability that an arbitrary IP address is a darknet address.

In the exemplary embodiment, input packets addressed to network configuration information (for example, an IP address) that the network configuration information management unit 140 does not manage are supposed to be input packets addressed to a darknet. Therefore, the infected terminal detection unit 600 detects that a terminal that has transmitted the input packets is a malware infected terminal.

Therefore, the network management apparatus 106 is able to detect a terminal infected with a bot and the like with a higher degree of accuracy. The infected terminal detection unit 600 isolating a detected terminal from the network enables a higher safety level to be achieved for the network.

(Hardware Configuration)

Figure 12:
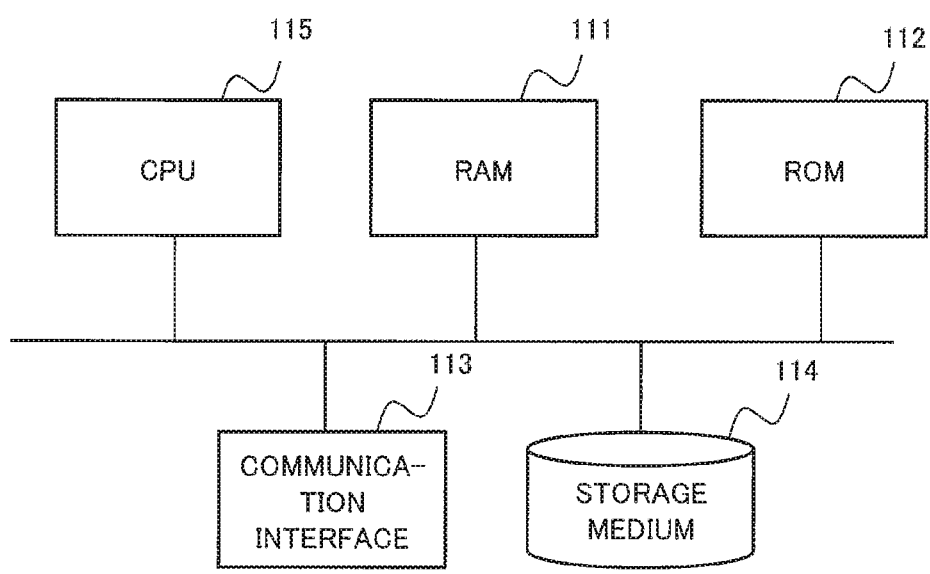
FIG. 12 is a diagram illustrating an example of a hardware configuration of the network management apparatuses based on which the network systems according to the respective exemplary embodiments of the present invention can be achieved.

The respective units of the network management apparatuses illustrated in FIGS. 1, 3, 9, and 11 may be achieved by hardware resources exemplified in FIG. 12. That is, a configuration illustrated in FIG. 12 includes a RAM (Random Access Memory) 111, a ROM (Read Only Memory) 112, a communication interface 113, a storage medium 114, and a CPU 115. The CPU 115 controls the overall operation of the network management apparatus by reading various software programs (computer programs) stored in the ROM 112 or the storage medium 114 onto the RAM 111 and executing the programs. That is, in the above-described exemplary embodiments, the CPU 115, referring to the ROM 112 or the storage medium 114 appropriately, executes software programs each of which executes a function (a unit) included in the network management apparatus.

The present invention described above using the respective exemplary embodiments as examples may be achieved in such a way that, after computer programs capable of achieving the above-described functions are supplied to the network management apparatus, the CPU 115 reads the computer programs onto the RAM 111 and executing the computer programs.

Such supplied computer programs may be stored in a readable and writable memory (transitory storage medium) or a computer-readable storage device, such as a hard disk apparatus. In such a case, the present invention can be considered to be made up of codes expressing such computer programs or storage media storing such computer programs.

In the above-described respective exemplary embodiments, cases in which the functions illustrated in the respective blocks of the network management apparatuses illustrated in FIGS. 1, 3, 9, and 11 are achieved by software programs were described as examples of cases in which the CPU 115 illustrated in FIG. 12 executes the functions. However, a portion or all of the functions illustrated in the respective blocks in FIGS. 1, 3, 9, and 11 may be achieved by hardware circuits.

The above-described exemplary embodiments are suitable exemplary embodiments for the present invention and do not limit the scope of the present invention to only the exemplary embodiments, and those skilled in the art can make modification and substitution of the exemplary embodiments without departing from the scope of the present invention to construct embodiments with various alterations applied thereto.

All or part of the exemplary embodiments described above may be described as in the following supplementary notes, but the present invention is not limited thereto.

(Supplementary Note 1)

A network management apparatus that connects to a terminal by way of a communication apparatus, including:

legitimate information generation means for generating legitimate identification information that is identification information to identify the terminal on a network that the network management apparatus manages, the legitimate identification information being managed as legitimate information by the network management apparatus;

fake information generation means for generating fake identification information that is different from the legitimate identification information and that cannot be used as it is for communication with another terminal;

management means for managing the legitimate identification information and the fake identification information in association with each other; and registration means for registering the fake identification information to the terminal.

(Supplementary Note 2)

The network management apparatus according to Supplementary Note 1, further including:

fake information regeneration means for, to change the fake identification information at a predetermined interval, generating new fake identification information for a terminal to which fake identification information subject to change is registered, wherein the management means manages legitimate identification information indicating the terminal to which fake identification information subject to change is registered and the generated new fake identification information in association with each other, and wherein the registration means changes, for the terminal to which fake identification information subject to change is registered, fake identification information registered to the terminal for the generated new fake identification information.

(Supplementary Note 3)

The network management apparatus according to Supplementary Note 2, wherein the fake information regeneration means, with respect to each of the predetermined group, generates the new fake identification information at an interval determined for each of the group.

(Supplementary Note 4)

The network management apparatus according to any one of Supplementary Notes 1 to 3, further including:

first determination means for determining whether a terminal connected by way of the communication apparatus is a terminal that is newly connected to the network management apparatus; and second determination means for, when it is determined, by the first determination means, that a terminal connected to the network management apparatus is not a newly connected terminal, determining whether the terminal is communicable with the another terminal, wherein, when it is determined, by the first determination means, that a terminal connected to the network management apparatus is a newly connected terminal, the legitimate information generation means and the fake information generation means generate the legitimate identification information and the fake identification information, respectively, and wherein when the second determination means determines that the terminal is communicable with the another terminal, the second determination means transfers an input packet transmitted from the terminal to the another terminal.

(Supplementary Note 5)

The network management apparatus according to Supplementary Note 4, wherein the input packet includes terminal identification information identifying the terminal that transmits the input packet and destination identification information identifying the another terminal with which the terminal performs communication, wherein the first determination means, by means of receiving the input packet from the terminal and confirming whether the terminal identification information included in the input packet is managed by the management means, determines whether the terminal is a terminal that is newly connected to the network management apparatus, and wherein the second determination means, based on the terminal identification information and the destination identification information, determines whether the terminal is communicable with the another terminal.

(Supplementary Note 6)

The network management apparatus according to Supplementary Note 5, wherein when the terminal identification information is the fake identification information that is registered to the terminal by the registration means and the fake identification information is managed by the management means, the first determination means determines that the terminal indicated by the terminal identification information is not a terminal that is newly connected to the network management apparatus.

(Supplementary Note 7)

The network management apparatus according to Supplementary Note 5 or 6, wherein the destination identification information is fake identification information that is registered to the another terminal by the registration means, and wherein the second determination means, using legitimate identification information of the another terminal that is associated with the destination identification information by the management means and legitimate identification information of the terminal, determines whether the terminal is communicable with the another terminal.

(Supplementary Note 8)

The network management apparatus according to any one of Supplementary Notes 5 to 7, further including:

detection means for confirming whether the destination identification information included in the input packet received by the first determination means is managed by the management means and, when the destination identification information is not managed by the management means, detecting that the terminal is a malware infected terminal, wherein the second determination means, when it is confirmed, by the detection means, that the destination identification information is managed by the management means, determines whether the terminal is communicable with the another terminal indicated by the destination identification information.

(Supplementary Note 9)

The network management apparatus according to any one of Supplementary Notes 4 to 8, wherein the legitimate information generation means generates an IP (Internet Protocol) address as the legitimate identification information, and wherein the second determination means, by means of confirming whether the terminal and the another terminal belong to the same subnet, determines whether the terminal and the another terminal are communicable with each other.

(Supplementary Note 10)

The network management apparatus according to any one of Supplementary Notes 4 to 8, wherein the management means further manages relation information indicating a relation between the legitimate identification information of the terminal and the legitimate identification information of the another terminal, and action information indicating an action between terminals indicated by the relation information in association with each other, and wherein the second determination means, using the action information, determines whether the terminal is communicable with the another terminal.

(Supplementary Note 11)

The network management apparatus according to any one of Supplementary Notes 4 to 8, wherein the legitimate information generation means generates, as the legitimate identification information, a character string uniquely specifying the terminal and information indicating a group to which the terminal belongs, and wherein the second determination means, by means of confirming whether the terminal and the another terminal belong to the same group, determines whether the terminal and the another terminal are communicable with each other.

(Supplementary Note 12)

The network management apparatus according to any one of Supplementary Notes 4 to 8, wherein the legitimate information generation means generates, as the legitimate identification information, a character string uniquely specifying the terminal and information indicating a group to which the terminal belongs, wherein the management means further manages relation information indicating at least any of relations between the terminal and the another terminal, between the terminal and a group to which the another terminal belongs, between a group to which the terminal belongs and the terminal, and between a group to which the terminal belongs and a group to which the another terminal belongs, and action information indicating an action between subjects indicated by the relation information in association with each other, and wherein the second determination means, using the action information, determines whether the terminal is communicable with the another terminal.

(Supplementary Note 13)

The network management apparatus according to any one of Supplementary Notes 1 to 12, further including:

storage means for storing information managed by the management means.

(Supplementary Note 14)

A network system, including:

a plurality of terminals;

a network management apparatus that manages a network; and a communication apparatus that connects each of the plurality of terminals to the network management apparatus, wherein the network management apparatus includes:

legitimate information generation means for generating, for a terminal, among the plurality of terminal, that is connected to the network management apparatus by way of the communication apparatus, legitimate identification information that is identification information to identify each of the plurality of terminals on a network that the network management apparatus manages, the legitimate identification information being managed as legitimate information by the network management apparatus;

fake information generation means for generating, for a terminal connected to the network, fake identification information that is different from the legitimate identification information and that the terminal cannot use as it is for communication with another terminal;

management means for managing the legitimate identification information and the fake identification information in association with each other; and registration means for registering the fake identification information to the terminal connected to the network.

(Supplementary Note 15)

A network management method for a network management apparatus that connects to a terminal by way of a communication apparatus, the method including:

generating legitimate identification information that is identification information to identify the terminal on a network that the network management apparatus manages, the legitimate identification information being managed as legitimate information by the network management apparatus;

generating fake identification information that is different from the legitimate identification information and that cannot be used as it is for communication with another terminal;

managing the legitimate identification information and the fake identification information in association with each other; and registering the fake identification information to the terminal.

(Supplementary Note 16)

A program that causes a computer comprising a network management apparatus that connects to a terminal by way of a communication apparatus to execute:

a process of generating legitimate identification information that is identification information to identify the terminal on a network that the network management apparatus manages, the legitimate identification information being managed as legitimate information by the network management apparatus;

a process of generating fake identification information that is different from the legitimate identification information and that cannot be used as it is for communication with another terminal;

a process of managing the legitimate identification information and the fake identification information in association with each other; and a process of registering the fake identification information to the terminal.

(Supplemental note 17)

A computer-readable recording medium, storing a program according to Supplemental note 16.

The present invention claims the benefits of priority based on Japanese Patent Application No. 2014-049856, filed on Mar. 13, 2014, the entire disclosure of which is incorporated herein by reference.

REFERENCE SIGNS LIST 1 to 4 Network system
100 to 106 Network management apparatus
110 Terminal determination unit
120 Fake information generation unit
130 Legitimate information generation unit
140 Network configuration information management unit
150 Fake information registration unit
160 Communication determination unit
170 Network configuration information storage unit
200 Network communication apparatus
300 Terminal
400 Terminal
500 Fake information regeneration unit
600 Infected terminal detection unit

The invention claimed is:

1. A network management apparatus that connects to a terminal by way of a communication apparatus, comprising:
a memory; and
at least one processor coupled to the memory, wherein the processor is configured to:
generate legitimate identification information that is identification information to identify the terminal on a network that the network management apparatus manages, the legitimate identification information being managed as legitimate information by the network management apparatus;
generate fake identification information that is different from the legitimate identification information and that cannot be used as it is for communication with another terminal;
manage the legitimate identification information and the fake identification information in association with each other; and
register the fake identification information to the terminal by way of the network communication apparatus, wherein
the processor is further configured to:
determine whether the terminal connected by way of the communication apparatus is a terminal that is newly connected to the network management apparatus; and
when it is determined that the terminal connected to the network management apparatus is not a newly connected terminal, determine whether the terminal is communicable with the another terminal,
wherein, when it is determined that the terminal connected to the network management apparatus is the newly connected terminal the processor generates the fake identification information, and
wherein when it is determined that the terminal is communicable with the another terminal, the processor performs processing of an input packet, the input packet being received from the network communication apparatus and transmitted from the terminal, to the network communication apparatus, and transfers the input packet to the another terminal,
wherein the input packet includes terminal identification information identifying the terminal that transmits the input packet and destination identification information identifying the another terminal with which the terminal performs communication,
wherein when receiving the input packet from the terminal, confirming whether the terminal identification information included in the input packet is managed by the processor, the processor determines whether the terminal is the terminal that is newly connected to the network management apparatus,
wherein the processor, based on the terminal identification information and the destination identification information, determines whether the terminal is communicable with the another terminal,
wherein, the processor confirms whether the destination identification information included in the input packet is managed by the processor and, when the destination identification information is not managed by the processor, detects that the terminal is a malware infected terminal, and wherein the processor determines whether the terminal is the terminal that is newly connected to the network management apparatus when a Media Access Control (MAC) address of the terminal identification information is not empty and an Internet Protocol (IP) address of the terminal identification information is empty, and sets the MAC address of the terminal identification information as a legitimate MAC address.

2. The network management apparatus according to claim 1, wherein the processor is further configured to:

change the fake identification information at a predetermined interval, generate new fake identification information for a terminal to which fake identification information subject to change is registered, wherein the processor manages legitimate identification information indicating the terminal to which fake identification information subject to change is registered and the generated new fake identification information in association with each other, and wherein the processor changes, for the terminal to which fake identification information subject to change is registered, fake identification information registered to the terminal for the generated new fake identification information.

3. The network management apparatus according to claim 2, wherein the processor, with respect to each of a predetermined group, is further configured to generate the new fake identification information at an interval determined for each of the group.

4. The network management apparatus according to claim 1, wherein when the terminal identification information is the fake identification information that is registered to the terminal by the processor and the fake identification information is managed by the processor, the processor determines that the terminal indicated by the terminal identification information is not a terminal that is newly connected to the network management apparatus.

5. The network management apparatus according to claim 1, wherein the destination identification information is fake identification information that is registered to the another terminal by the processor, and wherein the processor, using legitimate identification information of the another terminal that is associated with the destination identification information by the processor and legitimate identification information of the terminal, determines whether the terminal is communicable with the another terminal.

6. The network management apparatus according to claim 1, wherein the processor generates an IP (Internet Protocol) address as the legitimate identification information, and wherein the processor, by means of confirming whether the terminal and the another terminal belong to the same subnet, determines whether the terminal and the another terminal are communicable with each other.

7. The network management apparatus according to claim 1, wherein the processor further manages relation information indicating a relation between the legitimate identification information of the terminal and the legitimate identification information of the another terminal, and action information indicating an action between terminals indicated by the relation information in association with each other, and wherein the processor, using the action information, determines whether the terminal is communicable with the another terminal.

8. The network management apparatus according to claim 1, wherein the processor generates, as the legitimate identification information, a character string uniquely specifying the terminal and information indicating a group to which the terminal belongs, and wherein the processor, by means of confirming whether the terminal and the another terminal belong to the same group, determines whether the terminal and the another terminal are communicable with each other.

9. The network management apparatus according to claim 1, wherein the processor generates, as the legitimate identification information, a character string uniquely specifying the terminal and information indicating a group to which the terminal belongs, wherein the processor further manages relation information indicating at least any of relations between the terminal and the another terminal, between the terminal and a group to which the another terminal belongs, between a group to which the terminal belongs and the terminal, and between a group to which the terminal belongs and a group to which the another terminal belongs, and action information indicating an action between subjects indicated by the relation information in association with each other, and wherein the processor, using the action information, determines whether the terminal is communicable with the another terminal.

10. The network management apparatus according to claim 1, wherein the processor is further configured to:

cause information managed by the processor to be stored.

11. A network management method for a network management apparatus that connects to a terminal by way of a communication apparatus, the method comprising:

generating legitimate identification information that is identification information to identify the terminal on a network that the network management apparatus manages, the legitimate identification information being managed as legitimate information by the network management apparatus;

generating fake identification information that is different from the legitimate identification information and that cannot be used as it is for communication with another terminal;

managing the legitimate identification information and the fake identification information in association with each other;

registering the fake identification information to the terminal; and determining whether the terminal connected by way of the communication apparatus is a terminal that is newly connected to the network management apparatus; wherein when it is determined that the terminal connected to the network management apparatus is not a newly connected terminal, determining whether the terminal is communicable with the another terminal, wherein, when it is determined that the terminal connected to the network management apparatus is the newly connected terminal, generating the fake identification information, wherein when it is determined that the terminal is communicable with the another terminal, performing processing of an input packet, the input packet being received from the network communication apparatus and transmitted from the terminal, to the network communication apparatus, and transferring the input packet to the another terminal, wherein the input packet includes terminal identification information identifying the terminal that transmits the input packet and destination identification information identifying the another terminal with which the terminal performs communication, wherein when receiving the input packet from the terminal, confirming whether the terminal identification information included in the input packet is managed by the network management apparatus, determining whether the terminal is the terminal that is newly connected to the network management apparatus, wherein, based on the terminal identification information and the destination identification information, determining whether the terminal is communicable with the another terminal, confirming whether the destination identification information included in the input packet is managed by the network management apparatus and, when the destination identification information is not managed by the network management apparatus, detecting that the terminal is a malware infected terminal, and wherein determining whether the terminal is the terminal that is newly connected to the network management apparatus comprises determining when a Media Access Control (MAC) address of the terminal identification information is not empty and an Internet Protocol (IP) address of the terminal identification information is empty and setting the MAC address of the terminal identification information as a legitimate MAC address.

12. A non-transitory computer-readable recording medium recording a program that causes a computer comprising a network management apparatus that connects to a terminal by way of a communication apparatus to execute:

a process of generating legitimate identification information that is identification information to identify the terminal on a network that the network management apparatus manages, the legitimate identification information being managed as legitimate information by the network management apparatus;

a process of generating fake identification information that is different from the legitimate identification information and that cannot be used as it is for communication with another terminal;

a process of managing the legitimate identification information and the fake identification information in association with each other;

a process of registering the fake identification information to the terminal; and a process of determining whether the terminal connected by way of the communication apparatus is a terminal that is newly connected to the network management apparatus; wherein when it is determined that the terminal connected to the network management apparatus is not a newly connected terminal, a process of determining whether the terminal is communicable with the another terminal, wherein, when it is determined that the terminal connected to the network management apparatus is the newly connected terminal, a process of generating the fake identification information, wherein when it is determined that the terminal is communicable with the another terminal, a process of performing processing of an input packet, the input packet being received from the network communication apparatus and transmitted from the terminal, to the network communication apparatus, and transferring the input packet to the another terminal, wherein the input packet includes terminal identification information identifying the terminal that transmits the input packet and destination identification information identifying the another terminal with which the terminal performs communication, wherein when receiving the input packet from the terminal, a process of confirming whether the terminal identification information included in the input packet is managed by the network management apparatus, a process of determining whether the terminal is the terminal that is newly connected to the network management apparatus, wherein, based on the terminal identification information and the destination identification information, a process of determining whether the terminal is communicable with the another terminal, a process of confirming whether the destination identification information included in the input packet is managed by the network management apparatus and, when the destination identification information is not managed by the network management apparatus, a process of detecting that the terminal is a malware infected terminal, and wherein the process of determining whether the terminal is the terminal that is newly connected to the network management apparatus comprises determining when a Media Access Control (MAC) address of the terminal identification information is not empty and an Internet Protocol (IP) address of the terminal identification information is empty and setting the MAC address of the terminal identification information as a legitimate MAC address.

* * * * *